(12) United States Patent  
Turner (10) Patent No.: US 9,395,597 B2
(45) Date of Patent: Jul. 19, 2016

(54) COLOR-BASED STEREOSCOPIC PROJECTION SYSTEM AND METHOD

(71) Applicant: Laser Light Engines, Inc., Salem, NH (US)

(72) Inventor: Ian Turner, Stratham, NH (US)

(73) Assignee: Laser Light Engines, Inc., Salem, NH (US)

(*) Notice: Subject to any disclaimer, the term of this patent is extended or adjusted under 35 U.S.C. 154(b) by 322 days.

(21) Appl. No.: 14/195,910

(22) Filed: Mar. 4, 2014

(65) Prior Publication Data

US 2014/0185016 A1   Jul. 3, 2014

Related U.S. Application Data

(62) Division of application No. 12/553,890, filed on Sep. 3, 2009, now abandoned.

(51) Int. Cl.

| | |
|---|---|
| *H01S 3/23* | (2006.01) |
| *G02F 1/39* | (2006.01) |
| *G03B 27/26* | (2006.01) |
| *G02F 1/35* | (2006.01) |
| *G02B 27/10* | (2006.01) |
| *G02B 27/14* | (2006.01) |
| *G02B 27/26* | (2006.01) |
| *G02B 27/28* | (2006.01) |

(Continued)

(52) U.S. Cl.
CPC .......... *G02F 1/3532* (2013.01); *G02B 27/1026* (2013.01); *G02B 27/1046* (2013.01); *G02B 27/1073* (2013.01); *G02B 27/145* (2013.01); *G02B 27/149* (2013.01); *G02B 27/22* (2013.01); *G02B 27/2264* (2013.01); *G02B 27/26* (2013.01); *G02B 27/286* (2013.01); *G02B 27/48* (2013.01); *G02F 1/37* (2013.01); *G02F 1/39* (2013.01); *H01S 3/23* (2013.01); *H01S 3/2325* (2013.01); *H04N 9/3105* (2013.01); *H04N 9/3161* (2013.01); *H04N 13/0422* (2013.01); *H04N 13/0425* (2013.01); *H04N 13/0431* (2013.01); *H04N 13/0434* (2013.01); *H04N 13/0438* (2013.01); *H04N 13/0459* (2013.01); *H01S 3/005* (2013.01); *H01S 3/0092* (2013.01); *H01S 3/0606* (2013.01); *H01S 3/0941* (2013.01); *H01S 3/1611* (2013.01); *H01S 3/2383* (2013.01); *H01S 3/2391* (2013.01); *Y10T 29/49901* (2015.01)

(58) Field of Classification Search
CPC ........ G02B 27/22; G02B 27/225; G02F 1/39; G02F 1/3532; G02F 2001/392; H01S 3/23; H01S 3/2304; H01S 3/2316; H04N 9/31; H04N 9/3111; H04N 9/3161; H04N 13/0431; H04N 13/0438

See application file for complete search history.

(56) References Cited

U.S. PATENT DOCUMENTS

| | | | | |
|---|---|---|---|---|
| 4,866,720 A | * | 9/1989 | Holly | G02F 1/3532 372/22 |
| 5,740,190 A | * | 4/1998 | Moulton | G02F 1/3532 359/328 |

(Continued)

*Primary Examiner* — William C Dowling (74) *Attorney, Agent, or Firm* — GTC Law Group PC & Affiliates (57) ABSTRACT

A stereoscopic projection system and method of generating light that include two or three infrared lasers, two optical parametric oscillators, and six or seven second harmonic generators. Six colors of visible light are produced. Three bands of red, green, and blue form an image for the left eye of the viewer, while the other three bands of red, green, and blue form an image for the right eye of the viewer.

19 Claims, 6 Drawing Sheets

(51) Int. Cl.
*G02B 27/48* (2006.01)
*H04N 9/31* (2006.01)
*H04N 13/04* (2006.01)
*G02B 27/22* (2006.01)
*G02F 1/37* (2006.01)
*H01S 3/00* (2006.01)
*H01S 3/06* (2006.01)
*H01S 3/0941* (2006.01)
*H01S 3/16* (2006.01)

(56) References Cited

U.S. PATENT DOCUMENTS 6,774,881 B2 * 8/2004 Karakawa ............. G02F 1/3532
345/84
8,995,481 B2 * 3/2015 Achtenhagen ........ H01S 3/2383
372/23
2001/0017868 A1 * 8/2001 Kraenert ............... G02F 1/3532
372/23

* cited by examiner

COLOR-BASED STEREOSCOPIC PROJECTION SYSTEM AND METHOD

BACKGROUND OF THE INVENTION

A stereoscopic projector forms still or moving images that can be seen in three dimensions when the viewer is wearing filter glasses. One set of red, green, and blue bands of light are used to from images in one eye and a different set of red, green, and blue bands of light are used to form images in the other eye.

SUMMARY OF THE INVENTION

In general, in one aspect, a stereoscopic projection system including a first infrared laser, a first gain module that amplifies the light beam from the first infrared laser, a first second-harmonic generator (SHG) that frequency doubles the light beam from the first gain module, a first optical parametric amplifier (OPO) that parametrically amplifies the light beam from the first SHG, a second SHG that frequency doubles the first light beam from the first OPO; a third SHG that frequency doubles the second light beam from the first OPO, a second infrared laser, a second gain module that amplifies the light beam from the second infrared laser; and a fourth SHG that frequency doubles the light beam from the second gain module. Part of the light beam from the first SHG passes through the first OPO to form a remaining light beam which is green. The light beam from the second SHG is red, the light beam from the third SHG is blue, and the light beam from the fourth SHG is a second color of green.

Implementations may include one or more of the following features. The remaining light beam, the light beam from the second SHG, and the light beam from the third SHG may combine to form an image that is directed to one eye of the viewer and is not directed to the other eye of the viewer. The remaining light beam, the light beam from the second SHG, and the light beam from the third SHG may be polarized. There may be a first optical sensor that monitors the remaining light beam, a second optical sensor that monitors the light beam from the second SHG, and a third optical sensor that monitors the light beam from the third SHG. An output from the first optical sensor, an output from the second optical sensor, and an output from the third optical sensor may be used to tune the first OPO to achieve a desired white point. There may be a switch that switches the light beam from the first SHG, a second OPO that parametrically amplifies the light beam from the first SHG, a fifth SHG that frequency doubles the first light beam from the second OPO, and a sixth SHG that frequency doubles the second light beam from the second OPO. The switch may send the light beam from the first SHG alternately to the first OPO and the second OPO. The light beam from the fifth SHG may be a second color of red light, and the light beam from the sixth SHG may be a second color of blue light. The first infrared laser may be a neodymium-doped yttrium lithium fluoride laser and the second infrared laser may be a neodymium-doped yttrium aluminum perovskite laser. There may be a red filter that passes the first and second colors of red light, a green filter that passes the first and second colors of green light, and a blue filter that passes the first and second colors of blue light. The red filter, green filter, and blue filter may pass a combined optical output of at least 50 watts. The first color of green light may be at 523.5 nm, the second color of green light may be at 539.7 nm, the first color of red light may be at 615 nm, the second color of red light may be at 644 nm, the first color of blue light may be at 455 nm, and the second color of blue light may be at 440 nm. The first OPO may have a temperature of 131 degrees Celsius and the second OPO may have a temperature of 137 degrees Celsius. There may be a third infrared laser, a third gain module that amplifies the light beam from the third infrared laser, a fifth SHG that frequency doubles the light beam from the third gain module; a second OPO that parametrically amplifies the light beam from the fifth SHG, a sixth SHG that frequency doubles the first light beam from the second OPO, and a seventh SHG that frequency doubles the second light beam from the second OPO. The light beam from the sixth SHG may have a second color of red light, and the light beam from the seventh SHG may have a second color of blue light. The third infrared laser may be a neodymium-doped yttrium lithium fluoride laser. A light beam from the second SHG and a light beam from the third SHG may form a part of a first image on a light valve, and a light beam from the fourth SHG may form a part of a second image on the same light valve.

In general, in one aspect, a method of generating light including the steps of generating a first beam of infrared laser light, amplifying the first beam of infrared laser light, generating a first beam of green laser light from the first beam of infrared laser light, switching the first beam of green laser light to make a left beam of laser light and a right beam of laser light, generating a second beam of infrared laser light and a third beam of infrared laser light from the left beam of laser light, generating a first beam of red laser light from the second beam of infrared laser light and generating a first beam of blue laser light from the third beam of infrared laser light, generating a fourth beam of infrared laser light and a fifth beam of infrared laser light from the right beam of laser light, generating a second beam of red laser light from the fourth beam of infrared laser light and generating a second beam of blue laser light from the fifth beam of infrared laser light, dumping the remaining right beam of laser light, outputting the remaining left first beam of green laser light, the first beam of red laser light, and the first beam of blue laser light, generating a sixth beam of infrared laser light, amplifying the sixth beam of infrared laser light, generating a second beam of green laser light from the sixth beam of infrared laser light, and outputting the second beam of green laser light, the second beam of red laser light, and the second beam of blue laser light.

In general, in one aspect, a method of generating light including the steps of generating a first beam of infrared laser light, amplifying the first beam of infrared laser light, generating a first beam of green laser light from the first beam of infrared laser light, generating a second beam of infrared laser light and a third beam of infrared laser light from the first beam of green laser light, generating a first beam of red laser light from the second beam of infrared laser light and generating a first beam of blue laser light from the third beam of infrared laser light, outputting the remaining first beam of green laser light, the first beam of red laser light, and the first beam of blue laser light, generating a fourth beam of infrared laser light, amplifying the fourth beam of infrared laser light, generating a second beam of green laser light from the fourth beam of infrared laser light, generating a fifth beam of infrared laser light and a sixth beam of infrared laser light from the fourth beam of green laser light, generating a second beam of red laser light from the fifth beam of infrared laser light and generating a second beam of blue laser light from the sixth beam of infrared laser light, dumping the remaining second beam of green laser light, generating a seventh beam of infrared laser light, amplifying the seventh beam of infrared laser light, generating a third beam of green laser light from the seventh beam of infrared laser light, and outputting the third beam of green laser light, the second beam of red laser light, and the second beam of blue laser light.

DETAILED DESCRIPTION

Stereoscopic projection systems may be formed by using polarized light to form distinct images for the left eye and the right eye. These images simulate the images that would be seen in an actual three-dimensional scene. Polarized glasses are used to allow the left image to pass through to the left eye and the right image to pass through to the right eye, while blocking the left image from reaching the right eye, and blocking the right image from reaching the left eye. In other words, the image for the left eye is directed to the left eye and not to the right eye, whereas the image for the right eye is directed to the right eye and not to the left eye. Instead of polarized glasses, an alternate method is to separate left and right images by using spectral selection, for example as described in U.S. Pat. No. 6,283,597, the complete disclosure of which is incorporated herein by reference. In the spectral selection method, first wavelength bands of red, green, and blue are passed to the left eye, and second wavelength bands of red, green, and blue are passed to the right eye. The first bands and second bands are distinct so that there is little or no overlap between the first and second bands.

Figure 1:
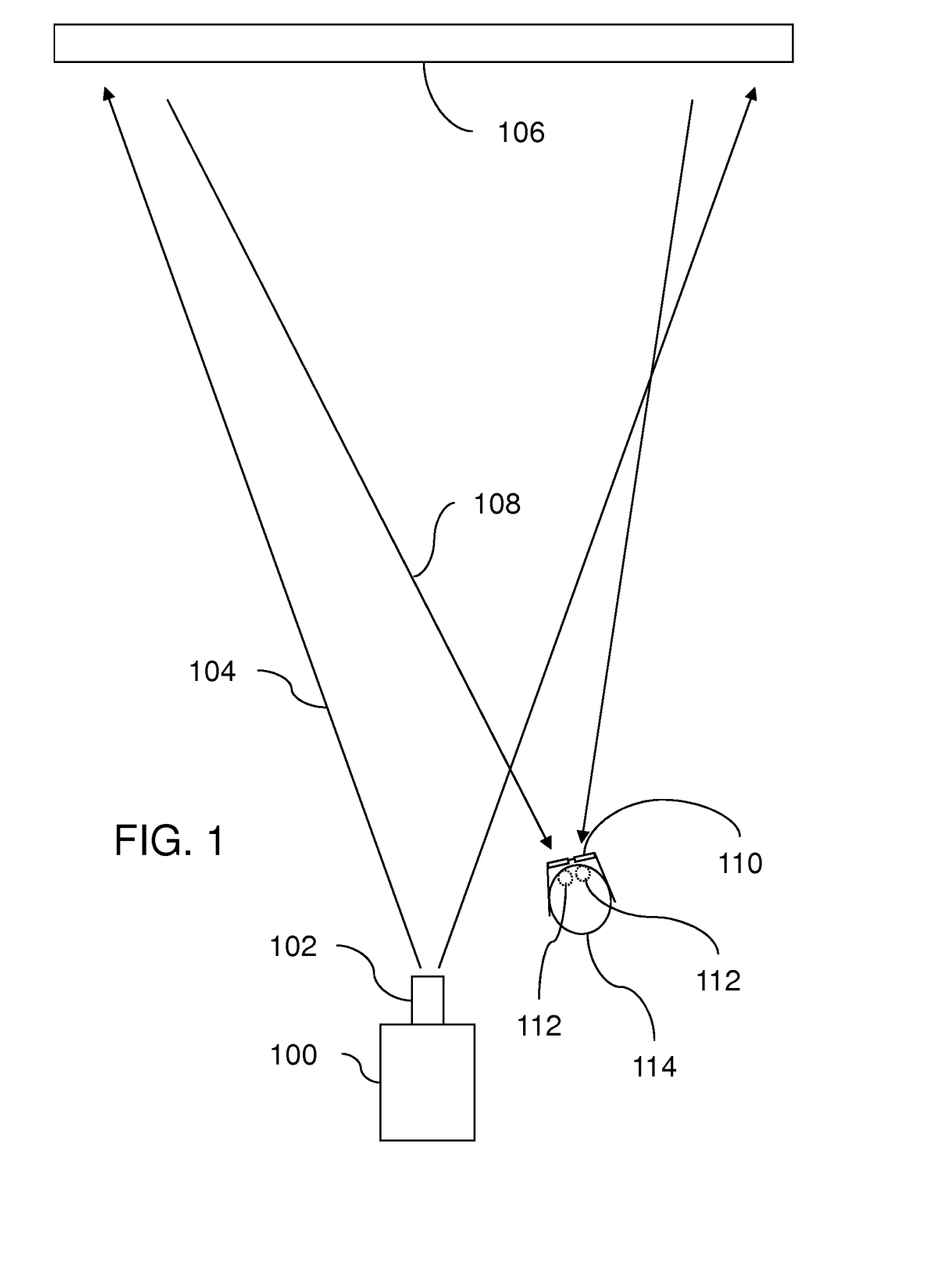
FIG. 1 is a top view of stereoscopic projection.

FIG. 1 shows the general layout of a stereoscopic image projection system. Projector 100 emits light beam 104 from lens 102. Light beam 104 impinges on screen 106 and reflects light beam 108 through filter glasses 110 to the eyes 112 of viewer 114. Projector 100 may form distinct images for each eye 112 by time sequencing different images for each eye 112. Alternately, projector 100 may be two separate projectors, one forming the image for the left eye and one forming the image for the right eye.

Figure 2:
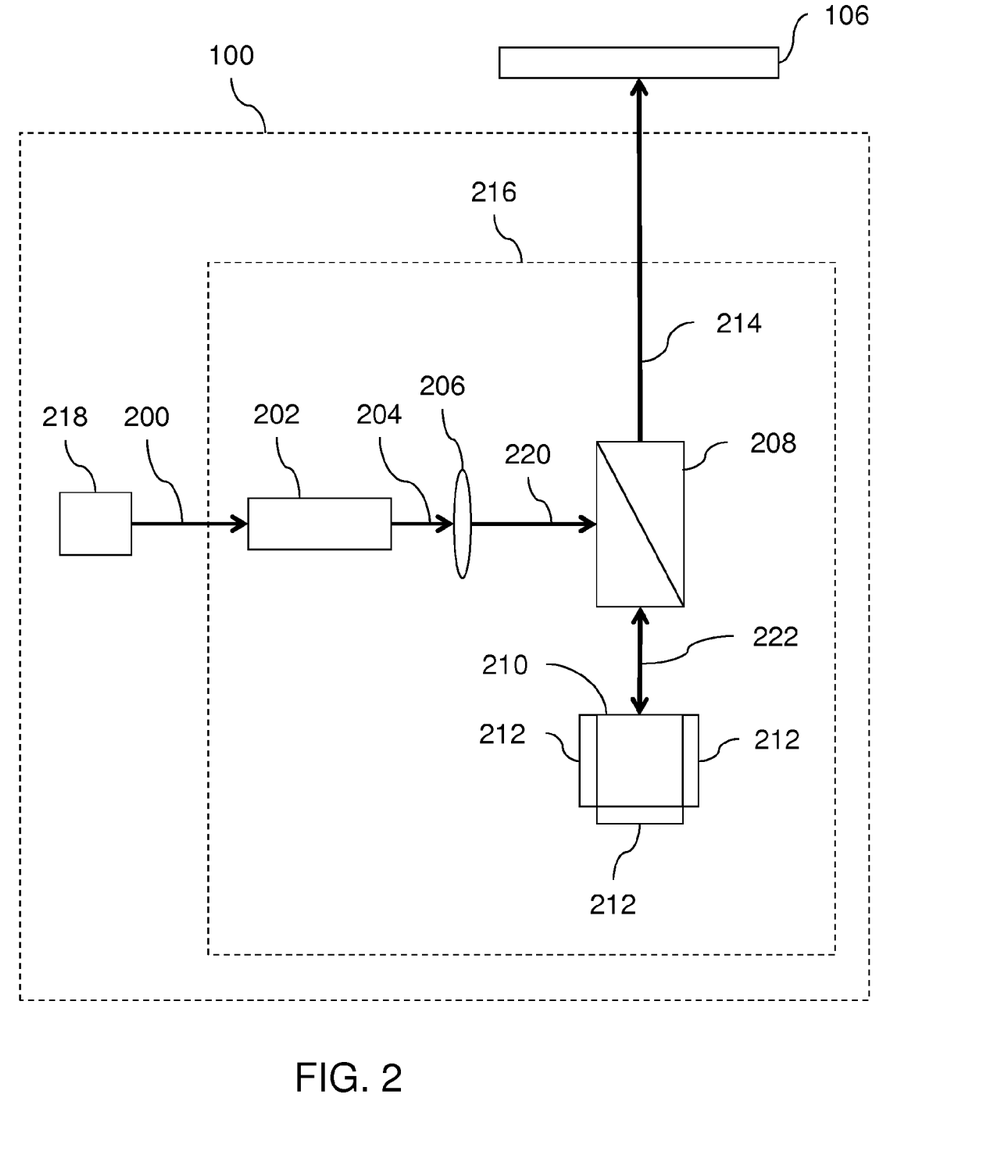
FIG. 2 is a block diagram of a projector light engine.

FIG. 2 shows an example of the operation of projector 100 which includes light system 218 and projection engine 216. Light system 218 emits first light beam segment 200 into projection engine 216. First light beam segment 200 enters mixing rod 202 which forms second light beam segment 204. Second light beam segment 204 enters lens 206 which forms third light beam segment 220. Third light beam segment 220 enters splitting prism 208 which forms fifth light beam segment 222. Fifth light beam segment 222 enters color prism 210 and is separated into three colors which then impinge on light valves 212. Each light valve 212 forms an image in a distinct color and then the imaged light beams are combined by color prism 210 and sent back along the path of fifth light beam path segment 222 into splitting prism 208. Splitting prism 208 outputs the imaged light beam as sixth light beam segment 214 to form an image on screen 106. Splitting prism 208 may be a total internal reflectance (TIR) prism and color prism 210 may be a Philips prism.

Figure 3:
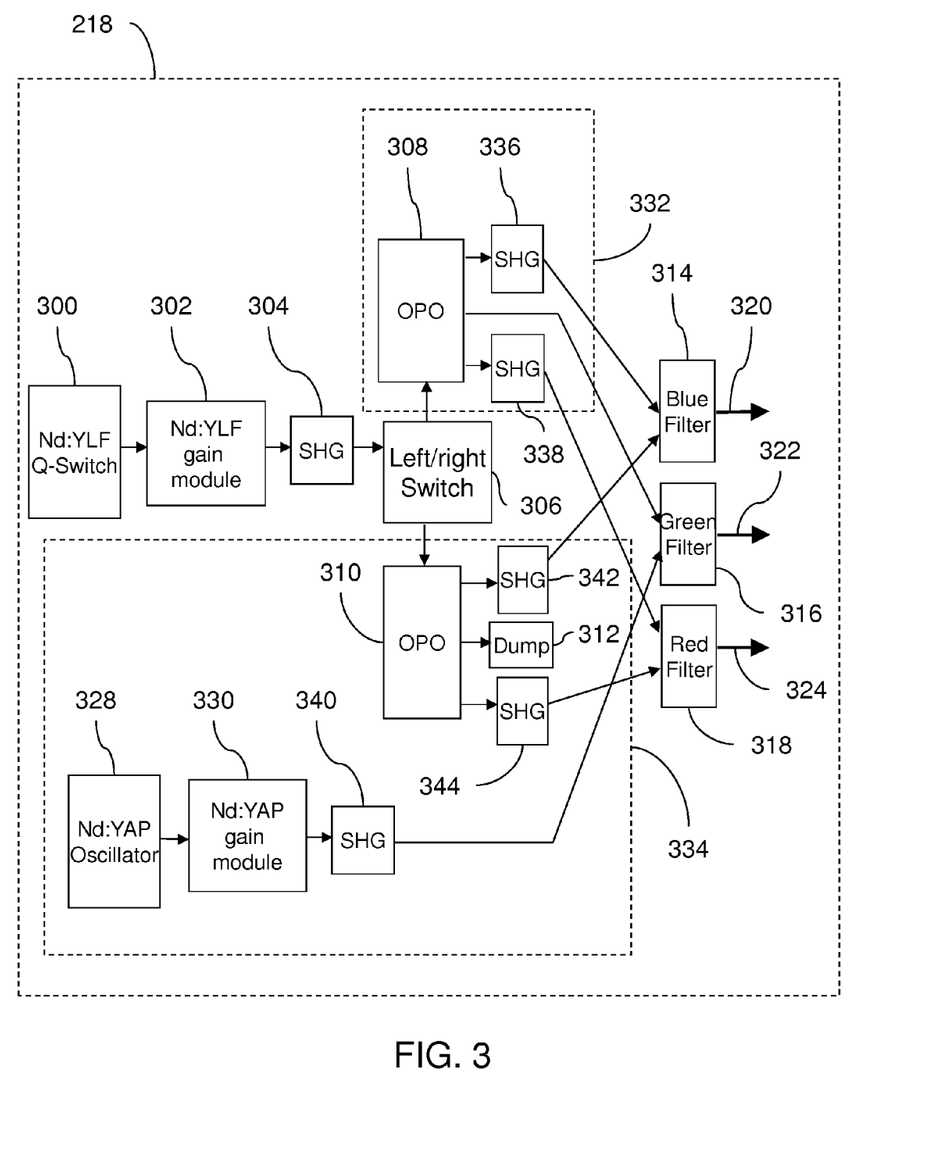
FIG. 3 is a block diagram of a laser light system based on two lasers.

FIG. 3 shows one embodiment of light system 218 which is based on two lasers. Neodymium-doped yttrium lithium fluoride (Nd:YLF) laser 300 generates light at 1047 nm which enters Nd:YLF gain module 302, is optically amplified by gain module 302, then enters second harmonic generation (SHG) unit 304 where it is converted to green light at 523.5 nm. The green light is rapidly switched by left/right switch 306 so that it passes to either optical parametric oscillator (OPO) 308 or OPO 310. A fraction of the 523.5 nm light in OPO 308 is converted to 910 nm and a fraction is converted to 1230 nm. The 910 nm light exits OPO 308 and is converted by SHG unit 336 into 455 nm blue light. The 1230 nm light exits OPO 308 and is converted by SHG unit 338 into 615 nm red light. The 532.5 nm green light that is not lost in OPO 308 or converted into blue or red light by OPO 308, exits OPO 308. The left/right switch 306 may be synchronized with the display of left and right images to use the green laser light efficiently.

A fraction of the 523.5 nm light in OPO 310 is converted to 880 nm and a fraction is converted to 1288 nm. The 880 nm light exits OPO 310 and is converted by SHG unit 342 into 440 nm blue light. The 1288 nm light exits OPO 310 and is converted by SHG unit 344 into 644 nm red light. The 532.5 nm green light that exits OPO 310 goes into beam dump 312.

Neodymium-doped yttrium aluminum perovskite (Nd:YAP) laser 328 generates light at 1079.5 nm which enters Nd:YAP gain module 330, is optically amplified by gain module 330, then enters SHG unit 340 where it is converted to green light at 539.7 nm.

The 455 nm blue light from OPO 308 and the 440 nm blue light from OPO 310 pass through blue filter 314 and form light beam 320. The 523.5 nm green light from OPO 308 and the 539.7 nm green light from SHG unit 340 pass through green filter 316 and form light beam 322. The 615 nm red light from OPO 308 and the 644 nm red light from OPO 310 pass through red filter 318 and form light beam 324. Light beams 320, 322, and 324 are combined together to form light beam 200.

OPO 308, SHG unit 336, and SHG unit 338 form light generation unit 332 which is used to form images for the left eye. Nd:YAP laser 328, ND:YAP gain module 330, SHG unit 340, OPO 310, SHG unit 342, beam dump 312, and SHG unit 344 form light generation unit 334 which is used to form images for the right eye. Alternately, light generation unit 332 may be used for the right eye and light generation unit 334 may be used for the left eye.

Light system 218 as described in FIG. 3 may produce at least 50 watts of optical power including all six colors of output in light beams 320, 322, and 324. If the total optical power output is 100 watts, Nd:YLF laser 300 may produce about 2 watts of 1047 nm light and Nd:YLF gain module 302 may produce about 300 watts of 1047 nm light. Nd:YAP laser 328 may produce about 2 watts of 1079.5 nm light and Nd:YAP gain module 330 may produce about 60 watts of 1079.5 nm light.

Figure 4:
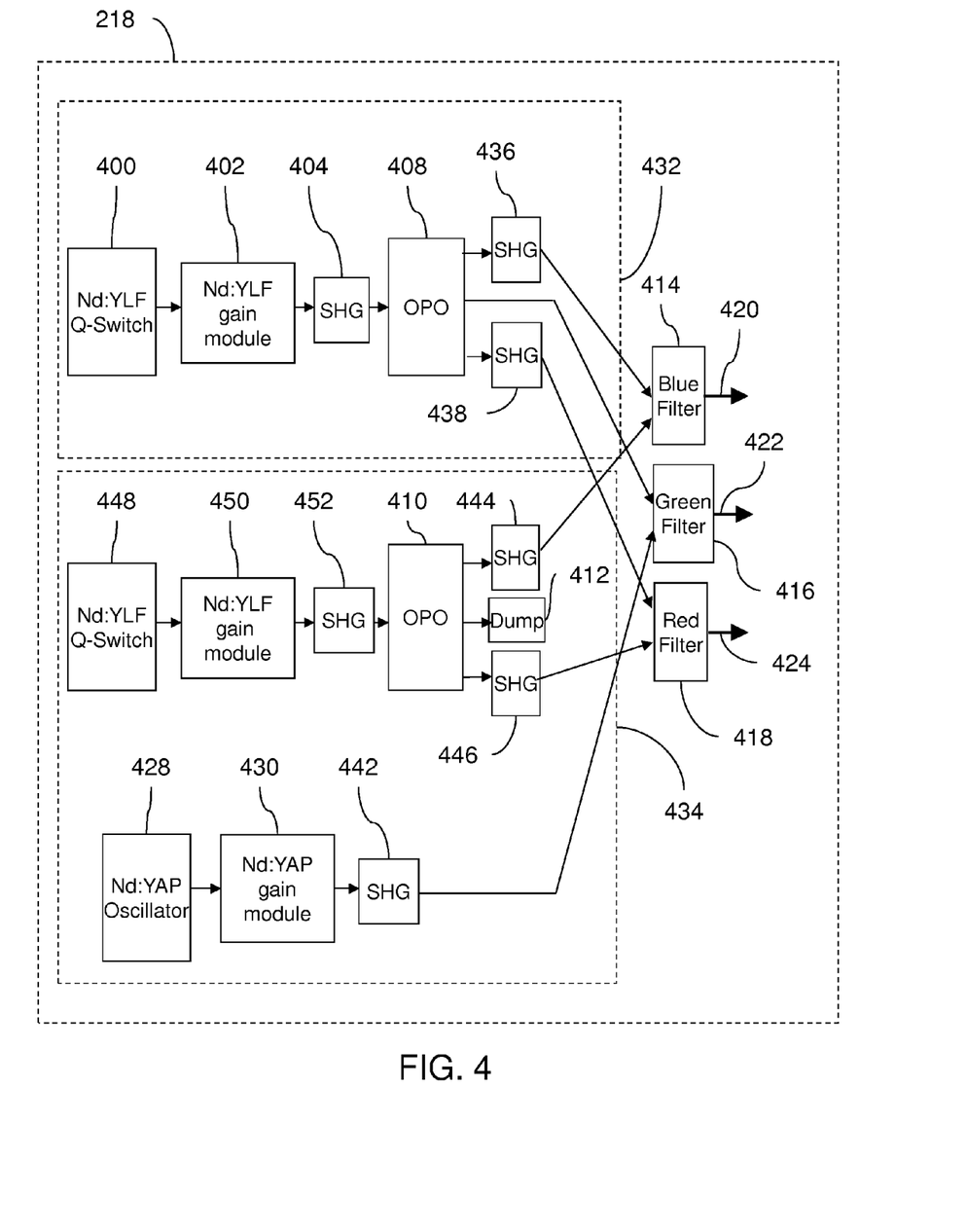
FIG. 4 is a block diagram of a laser light system based on three lasers.

FIG. 4 shows another embodiment of light system 218 which is based on three lasers. Neodymium-doped yttrium lithium fluoride (Nd:YLF) laser 400 generates light at 1047 nm which enters Nd:YLF gain module 402, is optically amplified by gain module 402, then enters SHG unit 404 where it is converted to green light at 523.5 nm and enters OPO 408. A fraction of the 523.5 nm light in OPO 408 is converted to 910 nm and a fraction is converted to 1230 nm. The 910 nm light exits OPO 408 and is converted by SHG unit 436 into 455 nm blue light. The 1230 nm light exits OPO 408 and is converted by SHG unit 438 into 615 nm red light. The 532.5 nm green light that is not lost in OPO 408 or converted into blue or red light by OPO 408, exits OPO 408.

Neodymium-doped yttrium lithium fluoride (Nd:YLF) laser 448 generates light at 1047 nm which enters Nd:YLF gain module 450, is optically amplified by gain module 450, then enters SHG unit 452 where it is converted to green light at 523.5 nm and enters OPO 410. A fraction of the 523.5 nm light in OPO 410 is converted to 880 nm and a fraction is converted to 1288 nm. The 880 nm light exits OPO 410 and is converted by SHG unit 444 into 440 nm blue light. The 1288 nm light exits OPO 410 and is converted by SHG unit 446 into 644 nm red light. The 532.5 nm green light that exits OPO 410 goes into beam dump 412.

Neodymium-doped yttrium aluminum perovskite (Nd:YAP) laser 428 generates light at 1079.5 nm which enters Nd:YAP gain module 430, is optically amplified by gain module 430, then enters SHG unit 442 where it is converted to green light at 539.7 nm.

The 455 nm blue light from OPO 408 and the 440 nm blue light from OPO 410 pass through blue filter 414 and form light beam 420. The 523.5 nm green light from OPO 408 and the 539.7 nm green light from SHG unit 442 pass through green filter 416 and form light beam 422. The 615 nm red light from OPO 408 and the 644 nm red light from OPO 410 pass through red filter 418 and form light beam 424. Light beams 420, 422, and 424 are combined together to form light beam 200. The blue, green, and red filters may be band pass filters that block visible colors and infrared light of wavelengths outside the pass band.

Nd:YLF laser 400, Nd:YLF gain module 402, SHG unit 404, OPO 408, SHG unit 436, and SHG unit 438 form light generation unit 432 which is used to form images for the left eye. Nd:YLF laser 448, Nd:YLF gain module 450, SHG unit 452, OPO 410, SHG unit 444, beam dump 412, SHG unit 446, Nd:YAP laser 428, ND:YAP gain module 430, and SHG unit 442, form light generation unit 434 which is used to form images for the right eye. Alternately, light generation unit 432 may be used for the right eye and light generation unit 434 may be used for the left eye.

Light system 218 as described in FIG. 4 may produce at least 50 watts of optical power including all six colors of output in light beams 420, 422, and 424. If the total optical power output is 100 watts, Nd:YLF lasers 400 and 448 each produce about 2 watts of 1047 nm light and Nd:YLF gain module 402 and 450 each produce about 300 watts of 1047 nm light. Nd:YAP laser 428 produces about 2 watts of 1079.5 nm light and Nd:YAP gain module 430 produce about 60 watts of 1079.5 nm light.

Figure 5:
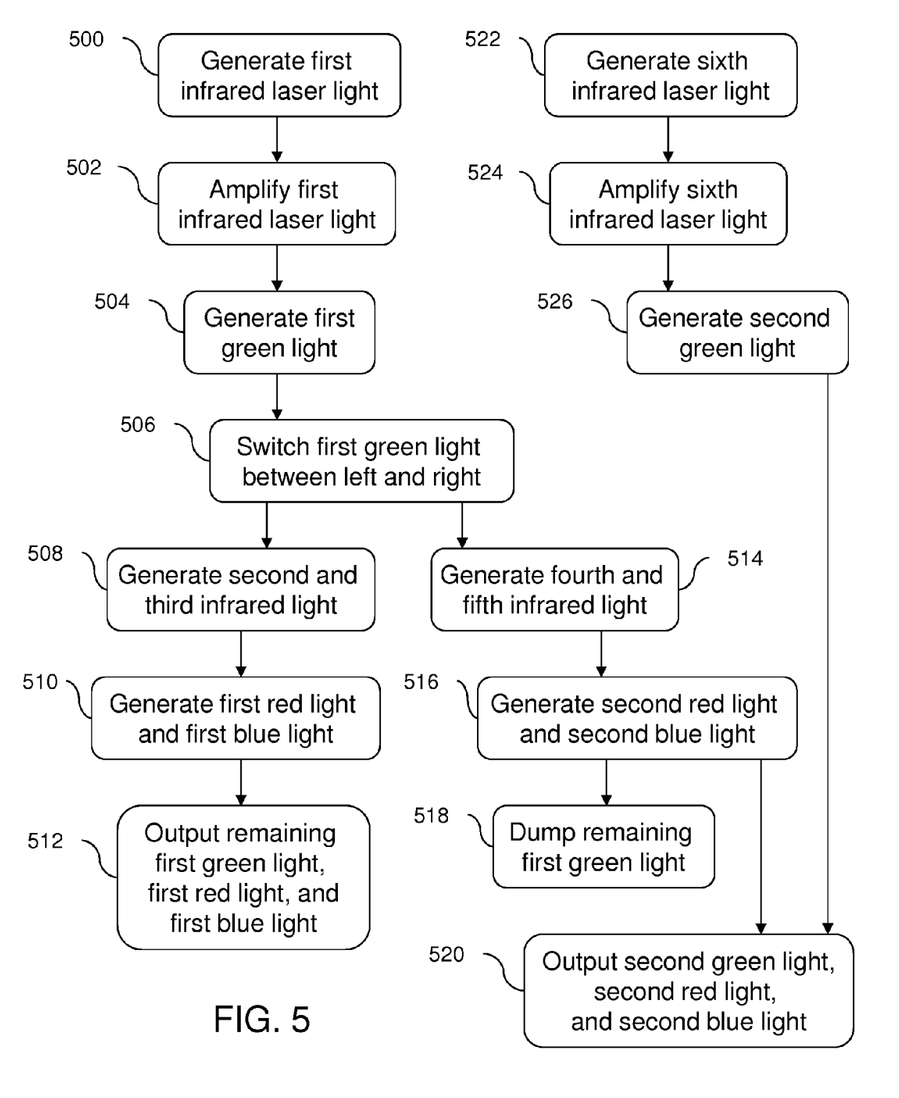
FIG. 5 is a flowchart of a method of generating light based on two lasers.

FIG. 5 shows a method of generating light based on two lasers which corresponds to the laser light system shown in FIG. 3. In step 500, a first beam of infrared laser light is generated. In step 502, the first beam of infrared light is amplified. In step 504, a first green light is generated by converting the first beam of infrared light to green light. In step 506, the first green light is switched between left eye and right eye beams. In step 508, the left, first green light is converted to second and third beams of infrared light. In step 510, first red light and first blue light are generated by converting the second and third beams of infrared light. In step 512, the remaining first green light, first red light, and first blue light are output by the method. In step 514, the right, first green light is converted to fourth and fifth beams of infrared light. In step 516, second red light and second blue light are generated by converting the fourth and fifth beams of infrared light. In step 518, the remaining right, first green light is absorbed by a beam dump. In step 522, a sixth beam of infrared laser light is generated. In step 524, the sixth beam of infrared light is amplified. In step 526, a second green light is generated by converting the sixth beam of infrared light to green light. In step 520, the second green light, second red light, and second blue light are output by the method.

Figure 6:
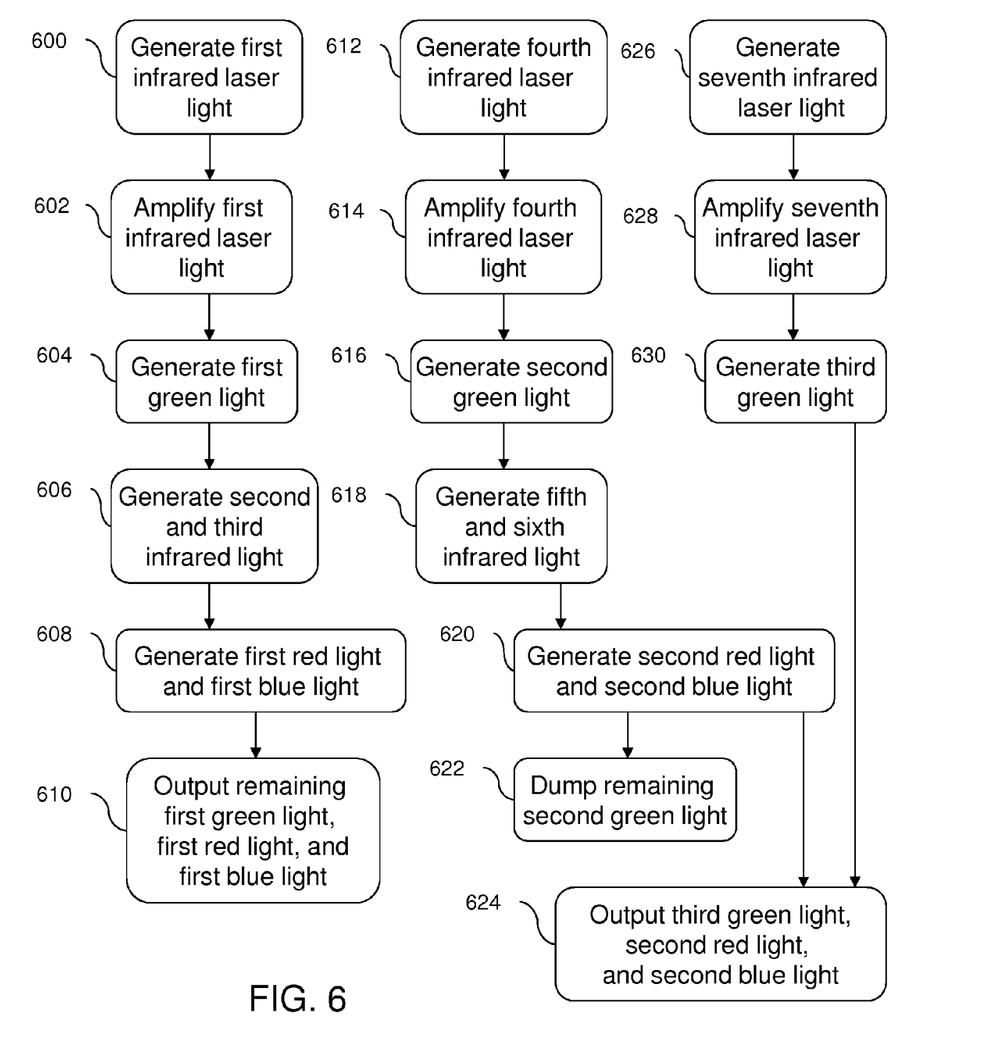
FIG. 6 is a flowchart of a method of generating light based on three lasers.

FIG. 6 shows a method of generating light based on three lasers which corresponds to the laser light system shown in FIG. 4. In step 600, a first beam of infrared laser light is generated. In step 602, the first beam of infrared light is amplified. In step 604, a first green light is generated by converting the first beam of infrared light to green light. In step 606, the first green light is converted to second and third beams of infrared light. In step 608, first red light and first blue light are generated by converting the second and third beams of infrared light. In step 610, the remaining first green light, first red light, and first blue light are output by the method. In step 612, a fourth beam of infrared laser light is generated. In step 614, the fourth beam of infrared light is amplified. In step 616, a second green light is generated by converting the first beam of infrared light to green light. In step 618, the second green light is converted to fifth and sixth beams of infrared light. In step 620, second red light and second blue light are generated by converting the fifth and sixth beams of infrared light. In step 622, the remaining second green light is absorbed by a beam dump. In step 626, a seventh beam of infrared laser light is generated. In step 628, the seventh beam of infrared light is amplified. In step 630, a third green light is generated by converting the seventh beam of infrared light to green light. In step 624, the third green light, second red light, and second blue light are output by the method.

OPOs such as those shown in elements 308, 310, 408, and 410 in FIGS. 3 and 4 use parametric amplification to convert a fraction of the input light into two other wavelengths. The detailed operation of OPOs is described in U.S. Pat. No. 5,740,190, the complete disclosure of which is incorporated herein by reference. By suitably designing the OPO and controlling operation parameters such as temperature, when the input light is green, the outputs may be blue and red, thus making all three colors required for a full-color projection display. By mixing red, green, and blue light, other colors may be generated in projector 100. In FIG. 3, OPO 308 and OPO 310 are controlled at different temperatures in order to make different output wavelengths. In FIG. 4, OPO 408 and OPO 410 are controlled at different temperatures in order to make different output wavelengths. In order to achieve the desired color of white light (also called the white point), there must be a certain fraction of red light, blue light, and green light mixed together. If the OPO under converts green light into blue light and red light, some green light must be wasted when forming white light. If the OPO over converts green light into blue light and red light, the OPO conversion efficiency can be controlled by slightly detuning the OPO in order to attain the desired white point. An optical sensor such as a color sensor may be employed for real time sensing of the white point and real time control of the OPO tuning to maintain the desired white point over time. An intensity sensor may likewise be employed for real time sensing of the output power and real time control of the light system output to maintain the desired output intensity over time. Alternately, each color channel can be monitored separately with an optical sensor to achieve the desired white point and overall output intensity. The outputs from the color or intensity sensors may be electrical signals that feed into electronic circuits that control the intensity of each color channel.

The OPOs shown in FIGS. 3 and 4 may be constructed from lithium triborate (LBO) crystals operated in the type I, noncritical phase matching mode. In this condition, the temperature of OPO 308 and OPO 408 may be 131 degrees Celsius and the temperature of OPO 310 and OPO 410 may be 137 degrees Celsius. The resultant output wavelengths of the laser light systems in FIGS. 3 and 4 may be 523.5 nm, 539.7 nm, 615 nm, 644 nm, 455 nm, and 440 nm. The wavelengths may vary 1 or 2 nm from these values without changing the essential nature of operation.

Laser light systems enable light to be generated in the narrow bands required by the spectrally selective stereoscopic glasses. This allows high brightness images even when projected on large screen sizes. Conventional projector light sources, such as Xenon bulbs, must be filtered to produce narrow bands and thus are highly inefficient leading to brightness limitations, especially for large screen sizes. Laser light systems also produce narrower bands than filtered Xenon sources which allow the colors to be better placed for achieving optimal color gamut and optimal isolation between the two eyes to reduce ghosting.

Gain modules such as those shown in FIGS. 3 and 4 use non-linear optical processes to amplify light so that the output beam has higher power than the input beam. The detailed operation of gain modules is described in U.S. Pat. No. 5,774,489, the complete disclosure of which is incorporated herein by reference. Gain modules include one or more states of gain where each stage of gain includes one non-linear optical crystal and associated pump lasers.

SHG units such as those shown in SHG units 304, 336, 338, 340, 342, 344, 404, 436, 438, 452, 442, 444, and 446 in FIGS. 3 and 4 use non-linear optical processes to convert the wavelength of the original light into a harmonic wavelength such as half the original wavelength. The detailed operation of SHG units is described in U.S. Pat. No. 4,019,159, the complete disclosure of which is incorporated herein by reference.

The wavelengths of light used for spectrally-selective stereoscopic imaging can be any wavelengths that can be filtered such that one set of wavelengths arrives only at one eye, and the other set arrives only at the other eye. There may be one wavelength for each eye, two wavelengths for each eye, three wavelengths for each eye, or more. The case of three wavelengths for each eye (six colors total) is the minimum number of wavelengths to produce a full color image. In the case of four wavelengths for each eye, a larger gamut of colors can be expressed than in the case of three wavelengths for each eye. The wavelengths described in FIGS. 3 and 4 may be adjusted to fit the requirements of the individual projection systems or available wavelength selective glasses.

The full-width half maximum (FWHM) bandwidths of the wavelength bands may be as narrow as 0.05 nm or as wide as 20 nm depending on the types of lasers used and the construction of the OPOs, gain modules, SHG units, and filters. Narrow wavelength bands are generally subject to increased visible speckle when compared to wider bands. Laser light systems allow a larger color gamut than conventional light sources such as Xenon lamps. Particularly in the green region of the color gamut, an improved color space is available because laser light systems allow substantial generation of light at 532.5 nm rather than the typical green wavelength of Xenon lamps which is centered near 546 nm.

The color gamut of the laser light system may be tuned by changing the operation temperature of the non-linear element in the OPO or other parameter of the OPO such that the red and blue wavelengths are shifted. Typically, when the red wavelength shifts towards the center of the visible wavelength band, the blue also shifts towards the center of the visible. This makes a direct tradeoff between size of the color gamut and brightness because when the red and blue are shifted towards the center of the visible wavelength band, the human eye perceives higher brightness according to the photopic sensitivity curve whereas when the red and blue are shifted away from the center of the visible wavelength band, the color gamut is larger, but the human eye perceives less brightness.

Q-switched lasers are often best to achieve the high power densities required for the non-linear effects in OPOs, gain modules, and SHG units. The Q-switching frequency may be in the range of 20 kHz to 300 kHz, with pulse widths of 5 ns to 100 ns. Continuous wave (also called oscillator) lasers may alternately be used in some cases such as is shown in lasers 328 and 428 of FIGS. 3 and 4.

Spectrally selective glasses, as shown in FIG. 110, allow left eye images to be transmitted to only the left eye and right eye images to be transmitted to only the right eye. The narrow bands of light from laser light systems enable the efficient use of narrow transmission bands in the spectrally selective glasses which has the benefits of reduced ghosting and improved rejection of ambient light. Glasses may be active (shutter) glasses or passive (non-shutter) glasses. In the case of active glasses, the glasses may be synchronized with the pulses of the laser light system to attain high system efficiency.

Various projector types can be used with laser light systems. In addition to the digital minor device (DMD) design shown in FIG. 1, laser light systems can be used with liquid crystal on silicon (LCOS) light valves, transmissive liquid crystal device (LCD) light valves, and other types of light valves. The design of the projector will be different for each type of light valve, but the laser light system may generally be substituted for a xenon or other broad band light source with very few or no changes in the projector design. This allows after-market substitution of the laser light system. If the projector is to be designed specifically for operation with a laser light system, the f# of the projector may be high to match the high f# of the laser light system. This may allow the projector to generate higher contrast images than a projector based on low f#, conventional light sources. Polarized laser light systems may allow more efficient light throughput when combined with light valves that operate with polarized light such as LCD and LCOS light valves. The polarization may be linear or circular.

Other implementations are also within the scope of the following claims.

What is claimed is:

1. A stereoscopic projection system comprising:
    a first infrared laser;
    a first gain module that amplifies a light beam from the first infrared laser;
    a first second-harmonic generator (SHG) that frequency doubles a light beam from the first gain module;
    a first optical parametric amplifier (OPO) that parametrically amplifies a light beam from the first SHG;
    a second SHG that frequency doubles a first light beam from the first OPO;
    a third SHG that frequency doubles a second light beam from the first OPO;
    a second infrared laser;
    a second gain module that amplifies a light beam from the second infrared laser; and
    a fourth SHG that frequency doubles a light beam from the second gain module;
    wherein part of the light beam from the first SHG passes through the first OPO to form a remaining light beam, the remaining light beam has a first wavelength of green light, a light beam from the second SHG has a first wavelength of red light, a light beam from the third SHG has a first wavelength of blue light; and a light beam from the fourth SHG has a second wavelength of green light.

2. The system of claim 1 wherein the remaining light beam, the light beam from the second SHG, and the light beam from the third SHG combine to form an image that is directed to one eye of a viewer and not directed to the other eye of the viewer.

3. The system of claim 1 wherein the remaining light beam, the light beam from the second SHG, and the light beam from the third SHG are polarized.

4. The system of claim 1 further comprising:
a first optical sensor that monitors the remaining light beam;
a second optical sensor that monitors the light beam from the second SHG; and
a third optical sensor that monitors the light beam from the third SHG.

5. The system of claim 4 wherein an output from the first optical sensor, an output from the second optical sensor, and an output from the third optical sensor are used to tune the first OPO to achieve a desired white point.

6. The system of claim 1 further comprising:
a switch that switches the light beam from the first SHG;
a second OPO that parametrically amplifies the light beam from the first SHG;
a fifth SHG that frequency doubles a first light beam from the second OPO; and
a sixth SHG that frequency doubles a second light beam from the second OPO;
wherein the switch sends the light beam from the first SHG alternately to the first OPO and the second OPO, and a light beam from the fifth SHG has a second wavelength of red light, and a light beam from the sixth SHG has second wavelength of blue light.

7. The system of claim 6 wherein the first infrared laser is a neodymium-doped yttrium lithium fluoride laser and the second infrared laser is a neodymium-doped yttrium aluminum perovskite laser.

8. The system of claim 6 further comprising:
a red filter that passes the first wavelength of red light and the second wavelength of red light;
a green filter that passes the first wavelength of green light and the second wavelength of green light; and
a blue filter that passes the first wavelength of blue light and the second wavelength of blue light.

9. The system of claim 8 wherein the red filter, the green filter, and the blue filter, pass a combined optical output of at least 50 watts.

10. The system of claim 6 wherein the first wavelength of green light is 523.5 nm, the second wavelength of green light is 539.7 nm, the first wavelength of red light is 615 nm, the second wavelength of red light is 644 nm, the first wavelength of blue light is 455 nm, and the second wavelength of blue light is 440 nm.

11. The system of claim 6 wherein the first OPO has a temperature of 131 degrees Celsius and the second OPO has a temperature of 137 degrees Celsius.

12. The system of claim 1 further comprising:
a third infrared laser;
a third gain module that amplifies a light beam from the third infrared laser;
a fifth SHG that frequency doubles a light beam from the third gain module;
a second OPO that parametrically amplifies a light beam from the fifth SHG;
a sixth SHG that frequency doubles a first light beam from the second OPO; and
a seventh SHG that frequency doubles a second light beam from the second OPO;
wherein a light beam from the sixth SHG has a second wavelength of red light, and a light beam from the seventh SHG has a second wavelength of blue light.

13. The system of claim 12 wherein the first infrared laser is a neodymium-doped yttrium lithium fluoride laser, the second infrared laser is a neodymium-doped yttrium aluminum perovskite laser, and the third infrared laser is a neodymium-doped yttrium lithium fluoride laser.

14. The system of claim 12 further comprising:
a red filter that passes the first wavelength of red light and the second wavelength of red light;
a green filter that passes the first wavelength of green light and the second wavelength of green light; and
a blue filter that passes the first wavelength of blue light and the second wavelength of blue light.

15. The system of claim 14 wherein the red filter, the green filter, and the blue filter, pass a combined optical output of at least 50 watts.

16. The system of claim 12 wherein the first wavelength of green light is 523.5 nm, the second wavelength of green light is 539.7 nm, the first wavelength of red light is 615 nm, the second wavelength of red light is 644 nm, the first wavelength of blue light is 455 nm, and the second wavelength of blue light is 440 nm.

17. The system of claim 12 wherein the first OPO has a temperature of 131 degrees Celsius and the second OPO has a temperature of 137 degrees Celsius.

18. A method of generating light comprising:
generating a first beam of infrared laser light;
amplifying the first beam of infrared laser light;
generating a first beam of green laser light from the first beam of infrared laser light;
switching the first beam of green laser light to make a left beam of laser light and a right beam of laser light;
generating a second beam of infrared laser light and a third beam of infrared laser light from the left beam of laser light;
generating a first beam of red laser light from the second beam of infrared laser light and generating a first beam of blue laser light from the third beam of infrared laser light;
generating a fourth beam of infrared laser light and a fifth beam of infrared laser light from the right beam of laser light;
generating a second beam of red laser light from the fourth beam of infrared laser light and generating a second beam of blue laser light from the fifth beam of infrared laser light;
dumping the remaining right beam of laser light;
outputting the remaining left first beam of green laser light, the first beam of red laser light, and the first beam of blue laser light;
generating a sixth beam of infrared laser light;
amplifying the sixth beam of infrared laser light;
generating a second beam of green laser light from the sixth beam of infrared laser light; and
outputting the second beam of green laser light, the second beam of red laser light, and the second beam of blue laser light.

19. A method of generating light comprising:
generating a first beam of infrared laser light;
amplifying the first beam of infrared laser light;

generating a first beam of green laser light from the first beam of infrared laser light;
generating a second beam of infrared laser light and a third beam of infrared laser light from the first beam of green laser light;
generating a first beam of red laser light from the second beam of infrared laser light and generating a first beam of blue laser light from the third beam of infrared laser light;
outputting the remaining first beam of green laser light, the first beam of red laser light, and the first beam of blue laser light;
generating a fourth beam of infrared laser light;
amplifying the fourth beam of infrared laser light;
generating a second beam of green laser light from the fourth beam of infrared laser light;
generating a fifth beam of infrared laser light and a sixth beam of infrared laser light from the fourth beam of green laser light;
generating a second beam of red laser light from the fifth beam of infrared laser light and generating a second beam of blue laser light from the sixth beam of infrared laser light;
dumping the remaining second beam of green laser light;
generating a seventh beam of infrared laser light;
amplifying the seventh beam of infrared laser light;
generating a third beam of green laser light from the seventh beam of infrared laser light; and
outputting the third beam of green laser light, the second beam of red laser light, and the second beam of blue laser light.

* * * * *